(12) United States Patent
Abbott et al.

(10) Patent No.: US 11,487,871 B2
(45) Date of Patent: Nov. 1, 2022

(54) METHODS AND SYSTEMS FOR DETECTING AND DEFENDING AGAINST INVALID TIME SIGNALS

(71) Applicant: San Diego Gas & Electric Company, San Diego, CA (US)

(72) Inventors: Ben A. Abbott, San Antonio, TX (US); Brian Proctor, Carlsbad, CA (US); Gerardo Trevino, San Antonio, TX (US); Paul Wood, San Antonio, TX (US); David Vickers, San Antonio, TX (US)

(73) Assignee: San Diego Gas & Electric Company, San Diego, CA (US)

( * ) Notice: Subject to any disclaimer, the term of this patent is extended or adjusted under 35 U.S.C. 154(b) by 578 days.

(21) Appl. No.: 15/348,901

(22) Filed: Nov. 10, 2016

(65) Prior Publication Data

US 2017/0060101 A1    Mar. 2, 2017

Related U.S. Application Data

(63) Continuation-in-part of application No. 14/611,184, filed on Jan. 31, 2015, now Pat. No. 10,310,091.

(51) Int. Cl.
*G06F 21/55* (2013.01)
*G06F 1/14* (2006.01)
(Continued)

(52) U.S. Cl.
CPC .......... *G06F 21/554* (2013.01); *G01S 19/215* (2013.01); *G04R 20/06* (2013.01);
(Continued)

(58) Field of Classification Search
CPC ....... G04R 20/02; G01S 19/215; G01S 19/13; G01S 19/20; G01S 19/23; G01S 19/235;
(Continued)

(56) References Cited

U.S. PATENT DOCUMENTS

| | | | | |
|---|---|---|---|---|
| 4,849,993 A | * | 7/1989 | Johnson | ................ H04L 7/0083 375/357 |
| 5,398,263 A | * | 3/1995 | Vanderspool, II | .... H04L 7/0331 455/503 |

(Continued)

FOREIGN PATENT DOCUMENTS

| | | | | |
|---|---|---|---|---|
| WO | WO-9600953 A2 | * | 1/1996 | ............. G06F 21/10 |
| WO | WO-0161374 A2 | * | 8/2001 | ............. G01S 5/021 |

(Continued)

*Primary Examiner* — Bernarr E Gregory
*Assistant Examiner* — Nuzhat Pervin

(57) ABSTRACT

Some embodiments of the time resilient system and methods disclosed herein can be configured to detect and defend against invalid time signals. According to various embodiments of the disclosed technology, the time resilient system include a receiver for collecting time signals sourced from an external clock. By way of example only, the external clock may be a high precision clock housed within a Global Positioning System. Other embodiments may include an internal clock calibrated to a time reflected on the external clock so that the internal clock and the external clock are synchronized. Additionally, a controller may monitor changes in time signals of the external over a period of time against the internal clock, where the system is alerted of a timing attack when the time signals collected from the receiver deviate a pre-determined time range with the time of the internal clock.

15 Claims, 5 Drawing Sheets

(51) Int. Cl.
*H04K 3/00* (2006.01)
*G01S 19/21* (2010.01)
*H04W 56/00* (2009.01)
*G04R 20/06* (2013.01)

(52) U.S. Cl.
CPC ............... *G06F 1/14* (2013.01); *H04K 3/22* (2013.01); *H04K 3/65* (2013.01); *H04K 3/90* (2013.01); *H04W 56/005* (2013.01); *G06F 2221/034* (2013.01)

(58) Field of Classification Search
CPC .... G06F 1/14; G06F 21/554; G06F 2221/034; H04K 3/90; H04W 56/005
USPC .................................................... 342/357.59
See application file for complete search history.

(56) References Cited

U.S. PATENT DOCUMENTS

| | | | | |
|---|---|---|---|---|
| 5,510,797 A * | 4/1996 | Abraham | ............... | G01S 19/14 370/320 |
| 5,530,846 A * | 6/1996 | Strong | ............... | G06F 1/14 713/400 |
| 5,533,123 A * | 7/1996 | Force | ............... | G06F 21/572 713/189 |
| 5,666,330 A * | 9/1997 | Zampetti | ............... | G04G 7/02 368/47 |
| 5,739,874 A * | 4/1998 | Badger | ............... | H03L 7/107 348/731 |
| 5,798,732 A * | 8/1998 | Eshenbach | ............... | G01S 19/235 342/357.62 |
| 5,826,066 A * | 10/1998 | Jardine | ............... | G06F 1/14 713/400 |
| 6,061,802 A * | 5/2000 | Gulick | ............... | G06F 1/12 713/400 |
| 6,169,753 B1 * | 1/2001 | Yoshida | ............... | H04J 3/0688 370/507 |
| 6,199,170 B1 * | 3/2001 | Dietrich | ............... | G06F 1/14 713/400 |
| 6,744,828 B1 * | 6/2004 | Uchiyama | ............... | H04L 27/2657 455/208 |
| 6,748,202 B2 * | 6/2004 | Syrjarinne | ............... | H04W 64/00 455/427 |
| 6,847,691 B2 * | 1/2005 | Torikoshi | ............... | G04R 20/02 713/400 |
| 7,142,154 B2 * | 11/2006 | Quilter | ............... | G04G 7/00 342/357.44 |
| 7,372,403 B2 * | 5/2008 | Fullerton | ............... | H04B 1/7183 342/357.29 |
| 7,522,688 B2 * | 4/2009 | Shemesh | ............... | G04R 20/02 375/357 |
| 7,558,157 B1 * | 7/2009 | Gardner | ............... | G01V 1/22 367/76 |
| 8,041,980 B2 * | 10/2011 | Uehata | ............... | H04L 9/3263 713/500 |
| 8,299,858 B2 * | 10/2012 | Gan | ............... | H03B 17/00 331/3 |
| 8,605,543 B2 * | 12/2013 | Ray | ............... | G01V 1/00 367/51 |
| 8,938,636 B1 * | 1/2015 | Hochschild | ............ | H04L 7/0012 713/400 |
| 9,219,938 B2 * | 12/2015 | Snow | ............... | H04N 21/4305 |
| 9,261,599 B1 * | 2/2016 | Golden | ............... | G01S 19/23 |
| 9,348,321 B2 * | 5/2016 | Dougan | ............... | G04R 40/00 |
| 9,400,330 B2 * | 7/2016 | Achanta | ............... | G01S 19/215 |
| 9,520,860 B2 * | 12/2016 | Whitehead | ............ | H04J 3/0688 |
| 9,541,649 B2 * | 1/2017 | Leibner | ............... | H04K 3/22 |
| 2001/0015927 A1 * | 8/2001 | Ooishi | ............... | G11C 7/1087 365/201 |
| 2001/0017600 A1 * | 8/2001 | Torikoshi | ............... | G04R 20/02 342/357.29 |
| 2004/0105341 A1 * | 6/2004 | Chamberlain | ............ | G01V 1/22 367/21 |
| 2005/0047275 A1 * | 3/2005 | Chamberlain | ............ | G01V 1/22 367/56 |
| 2005/0222789 A1 * | 10/2005 | West | ............... | G01R 31/31937 702/79 |
| 2006/0050772 A1 * | 3/2006 | Shemesh | ............... | G04R 20/02 375/145 |
| 2006/0291537 A1 * | 12/2006 | Fullerton | ............ | G06K 7/10306 375/130 |
| 2007/0253289 A1 * | 11/2007 | Chamberlain | ............ | G01V 1/22 367/51 |
| 2010/0017139 A1 * | 1/2010 | Adams | ............... | G01V 1/162 702/14 |
| 2010/0040369 A1 * | 2/2010 | Zhao | ............... | H04Q 11/0067 398/58 |
| 2010/0135378 A1 * | 6/2010 | Lin | ............... | H04L 7/0087 375/232 |
| 2010/0158051 A1 * | 6/2010 | Hadzic | ............... | H03L 7/087 370/503 |
| 2012/0020191 A1 * | 1/2012 | Shemesh | ............... | G04G 7/02 368/47 |
| 2012/0029818 A1 * | 2/2012 | Smith | ............... | G01C 21/165 701/501 |
| 2012/0032842 A1 * | 2/2012 | Smith | ............... | G01S 5/0263 342/357.29 |
| 2014/0003199 A1 * | 1/2014 | Dougan | ............... | H04J 3/0641 368/46 |
| 2014/0086010 A1 * | 3/2014 | Ray | ............... | G01V 13/00 367/50 |
| 2014/0111377 A1 * | 4/2014 | Achanta | ............... | G01S 19/215 342/357.58 |
| 2014/0327573 A1 * | 11/2014 | Leibner | ............... | H04K 3/65 342/357.59 |
| 2015/0025831 A1 * | 1/2015 | Mourey | ............... | G01K 1/022 702/130 |
| 2016/0211969 A1 * | 7/2016 | Liu | ............... | H03L 7/07 |
| 2016/0238999 A1 * | 8/2016 | Dougan | ............... | G04G 7/00 |
| 2017/0060101 A1 * | 3/2017 | Abbott | ............... | G06F 1/14 |
| 2017/0146665 A1 * | 5/2017 | Leibner | ............... | H04K 3/22 |

FOREIGN PATENT DOCUMENTS

| | | | | |
|---|---|---|---|---|
| WO | WO-2005029743 A2 * | 3/2005 | ............ | H04L 25/028 |
| WO | WO-2012167686 A1 * | 12/2012 | ............ | H03K 23/665 |
| WO | WO-2014029253 A1 * | 2/2014 | ............ | H04J 3/062 |

* cited by examiner

METHODS AND SYSTEMS FOR DETECTING AND DEFENDING AGAINST INVALID TIME SIGNALS

OTHER INFORMATION

This application is a continuation-in-part of and claims the benefit of U.S. patent application Ser. No. 14/611,184 filed on Jan. 31, 2015, which is incorporated herein by reference in its entirety.

TECHNICAL FIELD

The disclosed technology relates generally to Precision Navigation and Time (PNT) systems. More specifically, the present disclosure is directed towards detecting and fighting through invalid time signals that attempt to deceive and take control over time signal receivers.

BACKGROUND

A precision time source is a device that provides highly accurate time information for various time consuming devices, such as Global Positioning System (herein referred to as "GPS") receivers or network switches that rely on time stamped or transmitted data. The precision time is then distributed to various consuming devices through various means, such as RF or wired transmission. Consuming devices equipped with precision timing are then able to perform various time sensitive functions, such as the local redistribution of time, synchronized coordination of actions, and appropriate time tagging of data.

A GPS is a satellite-based passive radio navigation system that utilizes multiple GPS satellites to continuously transmit signals to a GPS ground based receiver. A GPS receiver is able to accurately track time and calculate its position by receiving the transmitted GPS time from atomic clocks (a precision time source) housed in GPS satellites continuously orbiting the Earth. By way of example, a GPS receiver is an element in a PNT system vulnerable to timing attacks that perturb or distort the accuracy of the GPS based time signals.

With the high precision and wide accessibility of GPS signals, GPS signals have become widely utilized as a trusted technique to synchronize devices spanned across wide geographic distances under a common time source. This method of time synchronization is especially critical for numerous infrastructure applications, such as the transmission of time sensitive and real-time data over communication systems, financial networks, and power grids. However, in recent years, GPS signals have been shown to be particularly vulnerable and highly susceptible to GPS spoofing attacks. A GPS spoofing attack is a covert technique that seeks to commandeer a victim's GPS receiver by deceiving a GPS receiver into trusting a fake or erroneous GPS signal. When a GPS receiver trusts a spoofed or faulty GPS signal, the attacker may manipulate the fake GPS signal to effectively transmit faulty time and position data to the GPS receiver. Because unencrypted civil GPS receivers are not properly equipped to detect such a spoofing threat, current receivers have no way for a GPS receiver to distinguish between a counterfeit and true GPS signal, thus allowing the timing or spoofing attack to go undetected for extended periods of time. As a result, GPS spoofing particularly poses a high risk to network systems that monitor and transmit time sensitive data.

However, it should be noted that such timing attacks discussed herein are not limited to GPS receivers. Rather, any receiver or system that relies on time signals and are incapable of independently detecting invalid time signals are susceptible to timing attacks.

BRIEF SUMMARY OF EMBODIMENTS

Some embodiments of the time resilient system and methods disclosed herein can be configured to detect and defend against invalid time signals. According to various embodiments of the disclosed technology, the time resilient system includes a receiver for collecting time signals sourced from an external clock. By way of example only, the external clock may be a high precision clock housed within a GPS satellite. Other embodiments may include an internal clock calibrated to a time reflected on the external clock so that the internal clock and the external clock are synchronized. Additionally, a controller may monitor changes in the time signals of the external clock over a period of time against the internal clock.

By way of example only, the internal clock may be a completely different time source from the external clock, where the internal clock is a time source that is able to help determine the authenticity of the timing signals received from the external clock. This is performed by monitoring for changes or deviations between the internal clock and the external clock. Any behavioral changes in the received time signal from the external clock with the calibrated internal clock indicates that a timing or spoofing attack is present.

Additionally methods for detecting and defending against invalid time signals are also included. Such methods include obtaining a local time source from an internal clock housed within a controller, receiving a time signal from an external clock transmitted to the controller, calibrating the local time source to a time indicated on the external clock, and monitoring the time single of the external clock against the internal time. Again, any behavioral changes in the received time signal from the external clock with the calibrated internal clock indicates that a timing or spoofing attack is present.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
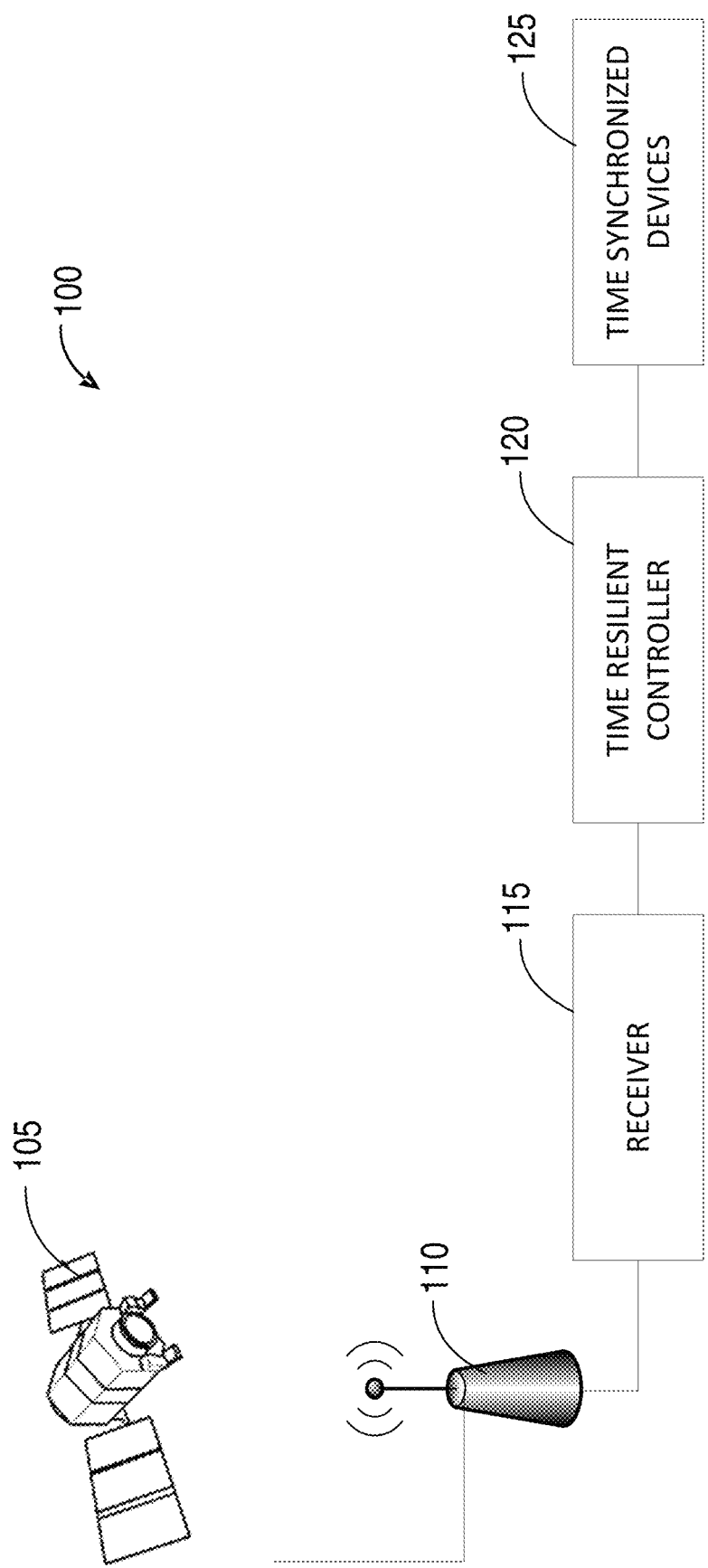
FIG. 1 is a diagram depicting a time resilient system that monitors the presence or absence of invalid time signals according to certain embodiments in the provided disclosure.

The figures are not intended to be exhaustive or to limit the disclosed technology to the precise form disclosed. It should be understood that the disclosed technology can be practiced with modification and alteration, and that the disclosed technology be limited only by the claims and the equivalents thereof.

DETAILED DESCRIPTION OF THE EMBODIMENTS

The following description is non-limiting and is made merely for the purpose of describing the general principles of the disclosed embodiments. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

The disclosure provides methods and system for detecting and defending against invalid time signals. In some embodiments, the time resilient system may include a receiver, internal clock, external clock, and controller. By way of example only, the controller may also include a processor to obtain and process time signals obtained by a receiver or any other time source. The controller may then monitor the presence or absence of any behavioral changes in the received time signals. Behavioral changes in the received time signals are an indication that the received time signals are invalid and that the receiver is currently being attacked or spoofed.

In some embodiments, the trusted time is initially generated from a local clock, otherwise referenced as an internal clock, where the time data is independently sourced and distinct from the received time signals sourced from an external clock. By way of example only, an external clock in one that transmits time signals to a receiver, such as a GPS receiver. The trusted time is initially calibrated to mimic or correlate the rate of the received time signals (that is secure and not under any timing attacks) so that the local clock and the received time signals mirror each other. Once the time resilient system is initialized with the calibration of the trusted time, the controller is then ready to detect for timing attacks by monitoring for any deviations of the received time signals from the trusted time.

In some embodiments, by way of example only, the controller may be configured to monitor the frequency of the incoming time signal received by the GPS receiver. Where the time signal is from a GPS signal, the GPS signal may be continuously compared to a reference time, otherwise referred to as the trusted time. By comparing the received time signal with the trusted time, any behavioral changes to the received time signal can be detected with respect to the local time.

Additionally, the controller may utilize the local clock to synchronize any time consuming devices. This allows the time consuming devices to be synchronized under a controlled time source that is independent from the received time signal while still synched to a high quality time source, since the local clock was initially calibrated to mirror the time rate of the received time signal. For example, in the instance that the trusted time is calibrated to a received time signal that is sourced from a high precision clock, such as a GPS, the trusted time is then calibrated to also perform as a high precision clock. This allows time consuming devices that are synchronized under the local clock to be connected and coordinated under a highly accurate and precise time source without any risk of being susceptible to a timing or spoofing attack. This is because the trusted time is only initially calibrated to run at a rate as detected in the received time signal when the time resilient system is being first set up. But the trusted time is not sourced from the received time signals. As such, the time consuming devices synchronized to the trusted time are not negatively impacted by any compromised received time signals, and the time resilient system is able to defend and fight through timing or spoofing attacks.

FIG. 1 is a diagram depicting a time resilient system 100 for monitoring incoming time signals according to certain embodiments in the provided disclosure. By way of example only, a GPS satellite 105 may continuously transmit authentic GPS signals to an antenna 110 configured to receive the GPS signals. The antenna may further boost or increase the GPS signals transmitted to the GPS receiver 115. However, it should be noted that the antenna 110 and receiver 115 may be replaced by another time source, and is not limited to GPS signals.

In some embodiments, a GPS receiver 115 may be a time receiver configured to decode satellite data signals so that a timepiece within a GPS receiver may accurately be synchronized to the atomic clock, or a precision time source, that is housed within the GPS satellite 105. As such, the GPS receiver 115 may calculate the data signals from the GPS satellite 105 to determine and transmit the GPS time to the time resilient controller 120. By way of example only, the GPS receiver 115 may transmit the accurate GPS time information to the time resilient controller 120 via an inter-range instrumentation group time code, or otherwise known as IRIG timecode. The IRIG timecode is a standardized format for transferring timing information from one device to another. In other embodiments, the GPS receiver 115 transmits time information to the time resilient controller 120 in pulses per second or one thousand pulses per second by way of example only.

To synchronize the time synchronized devices 125 under a common time source without retransmitting a received time signal that is vulnerable to timing attacks, a trusted IRIG signal may be generated as a trusted time source to achieve time synchronization with various time consuming devices. The trusted IRIG signal may be an independent time source generated from the IRIG timecode so that the trusted IRIG signal initially mimics the received time signal when first initializing or calibrating the time resilient system. The independent time source may be a local clock, or otherwise referred to as an internal clock, housed within the time resilient controller 120 that is independent from the received time signals sourced from an external clock. In such instances, this ensure that the IRIG signal output is never sourced from received time signals that are susceptible to timing attacks to the time synchronized devices 125. In other words, the time data and information that the trusted IRIG-signal outputs from the time resilient controller 120 is a secure and reliable time source incapable of later being manipulated by an invalid time signals, such as an erroneous or spoofed GPS signal. As a result, the time synchronized devices 125 are wholly incapable of being attacked or spoofed by invalid time signals.

However, because the IRIG signal output may be initially calibrated to a time rate of the received time signal that is capable of being attacked, it is important that the received time signal at this initial period is a trusted time signal. Otherwise, the IRIG signal output will be calibrated with an invalid time signal.

Figure 2:
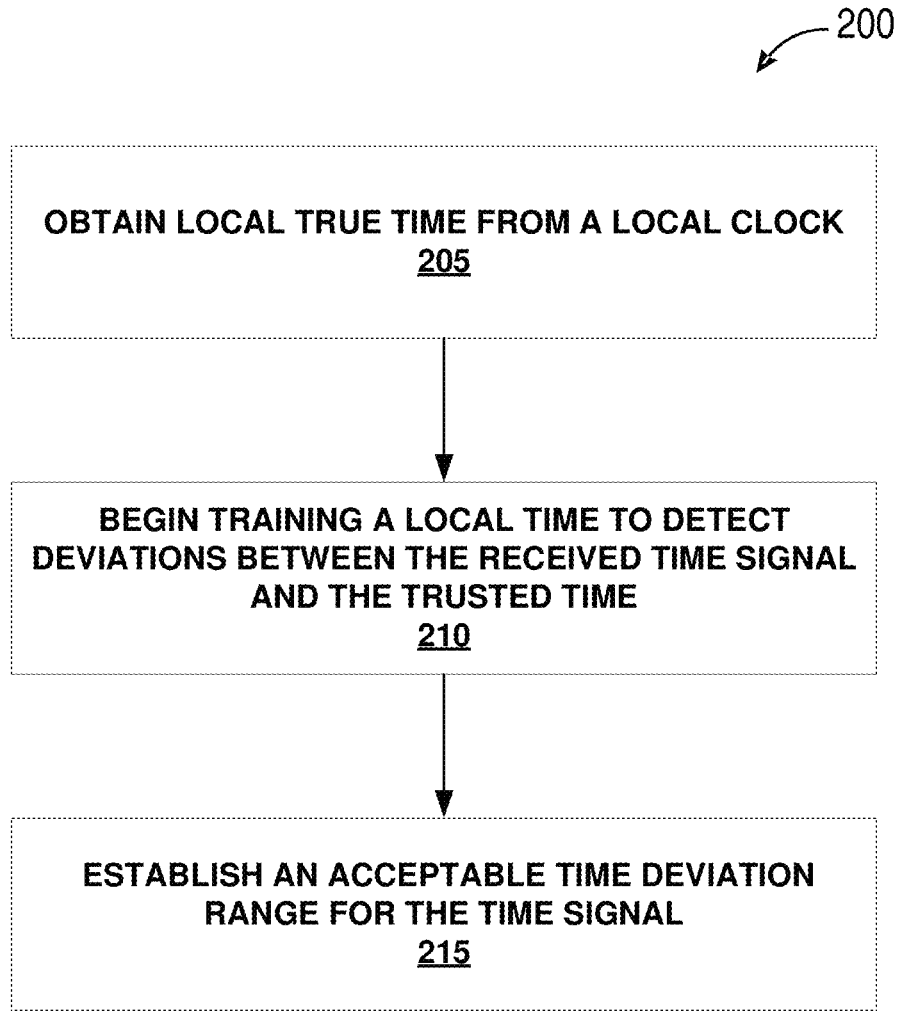
FIG. 2 is flowchart illustrating an exemplary process for initializing the time resilient system to a configured trusted time according to certain embodiments in the provided disclosure.

FIG. 2 is flowchart illustrating an exemplary process 200 for initializing the time resilient system to a configured trusted time according to certain embodiments in the provided disclosure. The exemplary process begins at operation 205 of method 200, where the time resilient system starts by gathering time data from a local clock.

By way of example only, a local clock may be a timepiece that indicates time, such as a disciplined oscillator, quartz clock, quantum clock, pulsar clock, radio clock, digital clock, mechanical watch, or differential GPS signal by way of example only. The local time must be configured from a trusted source because the determination of the authenticity of the received time signal will be dependent upon noticing any behavioral changes of the received time signal in comparison to the trusted time. Thus, this validation method of determining the authenticity of the time signal is dependent upon assuming that the local time is a trustworthy time signal or source.

Once the local time is initially configured from a trusted time signal, the time resilient system may start building a time model, or a trusted time, at operation 210 to begin detecting for timing attacks on the received time signals. This trusted time is now the standard or reference time so that when the received time signal no longer corresponds to the trusted time, the presence of a timing attack on the received time signal is discovered. Once the local time is disciplined and calibrated to the secure received time signal, the time resilient controller may now begin to detect and defend against invalid time signals. By way of example only, as indicated in FIG. 1, the GPS time information may be transmitted to the time resilient controller in the form of an IRIG timecode.

The exemplary process then proceeds to operation 215 of method 200, where an acceptable deviation range between the trusted time and received time from the time signal is established. Because received signals that change over a period of time indicates a spoofed or invalid time signal, monitoring the behavioral changes to the received signals indicate the presence of erroneous or faulty received signals. Furthermore, this exemplary process may detect even slow timing attacks that are often difficult to detect because the change in the time is very small, but significant over extended periods of time. As such, the time resilient controller may constantly monitor the received time of the time signal with the trusted time, where any behavioral changes, no matter how slight to the received time, will be immediately apparent.

Going back to exemplary operation 215 of method 200, an acceptable deviation range of the trusted time and received time is determined and established so that in the instance that the received time deviates past the determined acceptable range, an alert is created to notify the presence of a potential timing attack on the received time signals.

By way of example only, the acceptable deviation range of the received signal from the local time or trusted time may be configured based on the quality of the local clock used to source the trusted time. In the instance that the local clock is characterized as high quality time source, the determined acceptable deviation may be several hours, while a lower quality time source may require an acceptable deviation of a few seconds. By way of another example, the acceptable deviation of the time signal from the trusted time may be an established time frame selected by a user.

Figure 3A:
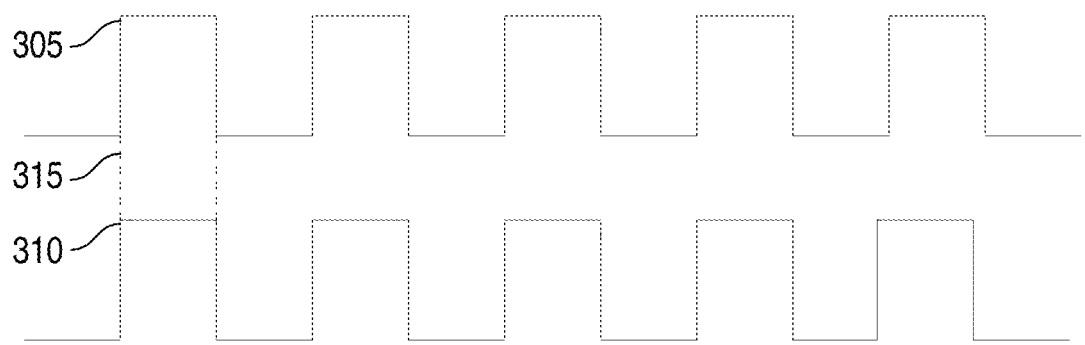
FIG. 3A is a diagram depicting a local time source configured to a corresponding external time signal according to certain embodiments in the provided disclosure.

FIG. 3A is a diagram depicting a trusted time 310 calibrated to a corresponding received time 305 from the time signal according to certain embodiments in the provided disclosure. As illustrated, the local time 310 is disciplined to mirror, or replicate, the received time 305, as further indicated by 315. When the local time 310 mirrors the received time, the local time 310 now is referenced to as the trusted time. In the instance that the received time 305 is a high precision clock, the trusted time is calibrated to also perform as a high precision clock without the downside of being attacked or spoofed by an invalid time signal.

Figure 3B:
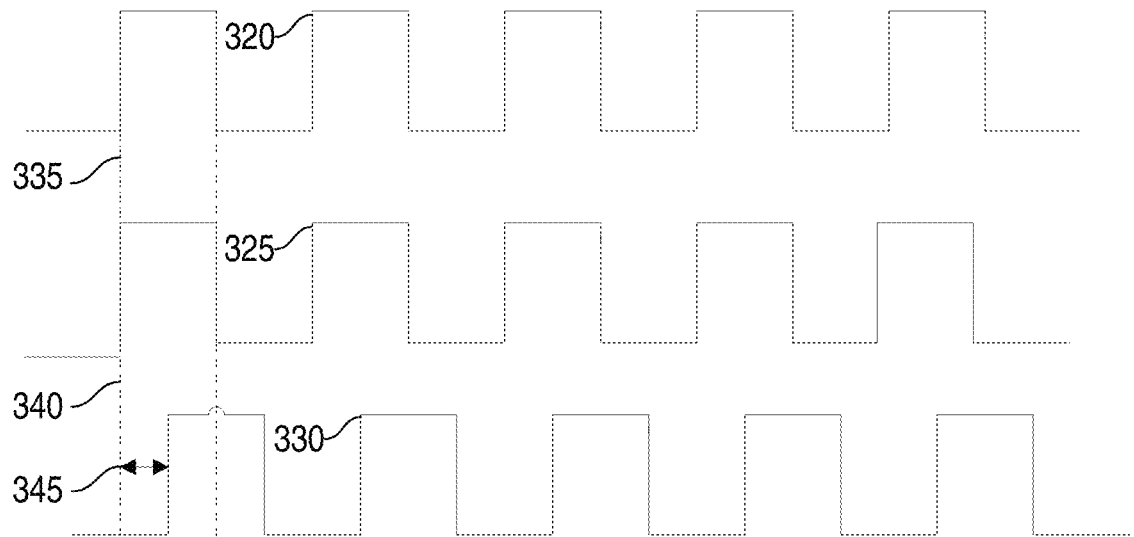
FIG. 3B is a diagram depicting an adjusted trusted time constructed by adjusting the local time to an offset time according to certain embodiments in the provided disclosure.

FIG. 3B is a diagram depicting an adjusted trusted time 330 constructed by further calibrating the trusted time 325 to an offset time according to certain embodiments in the provided disclosure. At such an instance, the initial trusted time 325 is now characterized as the adjusted trusted time 330. As further illustrated, the shift in the offset time to produce the adjusted trusted time 330 results in a constant time deviation between the initial trusted time 330 and the received time 320 of the time signal, as further indicated in 345.

Figure 4:
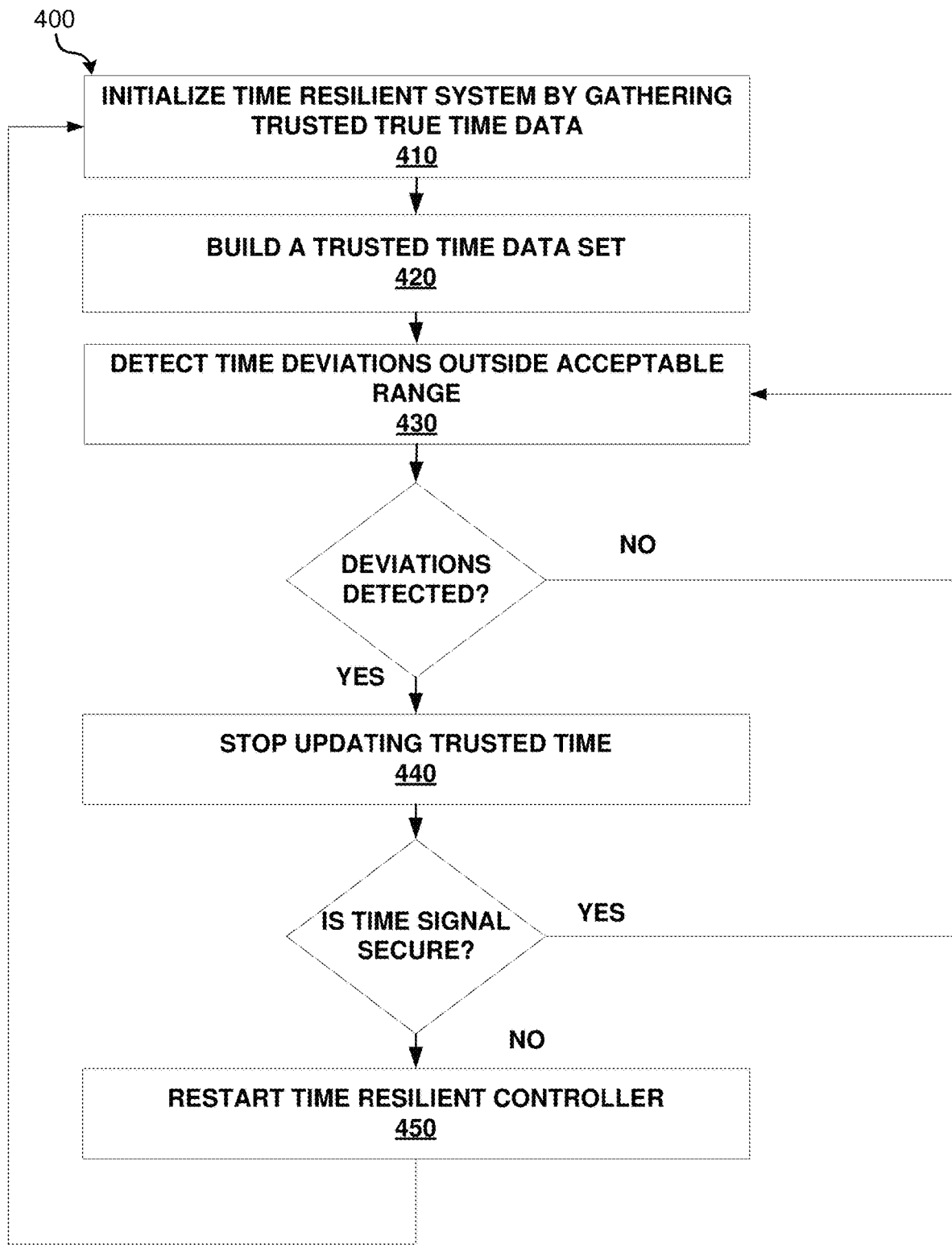
FIG. 4 is a flowchart depicting a method of operating the time resilient system according to certain embodiments of the provided disclosure.

FIG. 4 is a flowchart depicting a method of operating a time resilient system according to certain embodiments of the provided disclosure. The exemplary process begins at operation 410 of method 400, where the time resilient system is initialized by first gathering time data from a trusted time source.

The exemplary process then proceeds to operation 420 of method 400, where the time resilient system builds a trusted time by calibrating the local clock to the received time signal. A trusted time may be created by mirroring or selectively shifting the configured local clock to an offset time with respect to time rate of the received time signal. In other words, the trusted time is a reference time because any deviations of the received time as compared to the trusted time is now immediately apparent, where such deviations are an indication of an invalid or spoofed time signal.

The trusted time may continuously be calibrated or disciplined against the received time signals. This is to prevent the trusted time from experiencing the phenomenon of clock drifting. All time sources experience clock drifting, which is when a clock, such as the local clock in this instance, begins to drift apart or gradually desynchronize from another clock. As such, the trusted time may need to be consistently or often re-calibrated against the received time to prevent clock drifting. However, the re-calibration is only performed when the time resilient controller does not detect a timing attack, or else the local clock may be re-calibrated to a faulty time.

As such, the next exemplary process proceeds to operation 430 of method 400, where the time resilient system monitors the received time signal to detect any time deviations outside an established acceptable range against the trusted time. In the instance the time deviations exceed the acceptable range, an alert is generated notifying the time resilient system of a timing or a spoofing attack, where the time signal has likely been compromised. In some embodiments, an alert may be issued to a user or network system that a timing attack has been identified However, any time synchronized devices synched to the trusted time source is unaffected by the timing attack, since the trusted time does not use the received time signals to maintain time. As a result, a faulty or spoofed time signal has no impact on the corresponding time synchronized devices and any calibration of the trusted time with the received time is immediately stopped.

In the event that an invalid time signal is detected, the exemplary process proceeds to operation 440, where the trusted time may continue to indicate time to the corresponding time synchronization devices, but immediately stops updating or calibrating the trusted time with the corresponding received time signal. As long as the reference time does not experience time drift, the reference time may continually transmit precise and accurate time information to the time synchronized devices. By way of example only, the reference time may continue to transmit the reference time to the time synchronized devices during a time attack for as long as the stability of the internal clock will allow without undergoing time drifting, thus allowing the time resilient system to fight through a timing attack.

The exemplary process then proceeds to operation 450 of method 400, where the time resilient system restarts the system in the instance that the received signal fails to revert back to a trusted received signal. By way of example only, the received signal may be trusted when the received time reverts back to the acceptable deviation range as established in operation 430, which allows the time resilient system to fight through a timing attack. However, where the timing attack is persistent over extended periods of time, the local clock may begin to experience time drifting.

When time drifting occurs, the time synchronized devices synched to trusted time may no longer be precise or accurate. In such instances, a rebooting of the time resilient system may be required where the time resilient system is no longer able to fight through the timing attack. By way of example, the rebooting may be initiated after a pre-determined time period when the received time fails to revert back to the acceptable deviation range. The determination of the pre-determined time period may depend on the time quality of the internal clock used to source the trusted time. Where the internal clock is a high quality time source, the time resilient system may be able to fight through a timing attack for several hours, perhaps even days. However, where the internal clock is a lower quality time source, the time resilient system may be only able to fight through a timing attack for several minutes.

Figure 5:
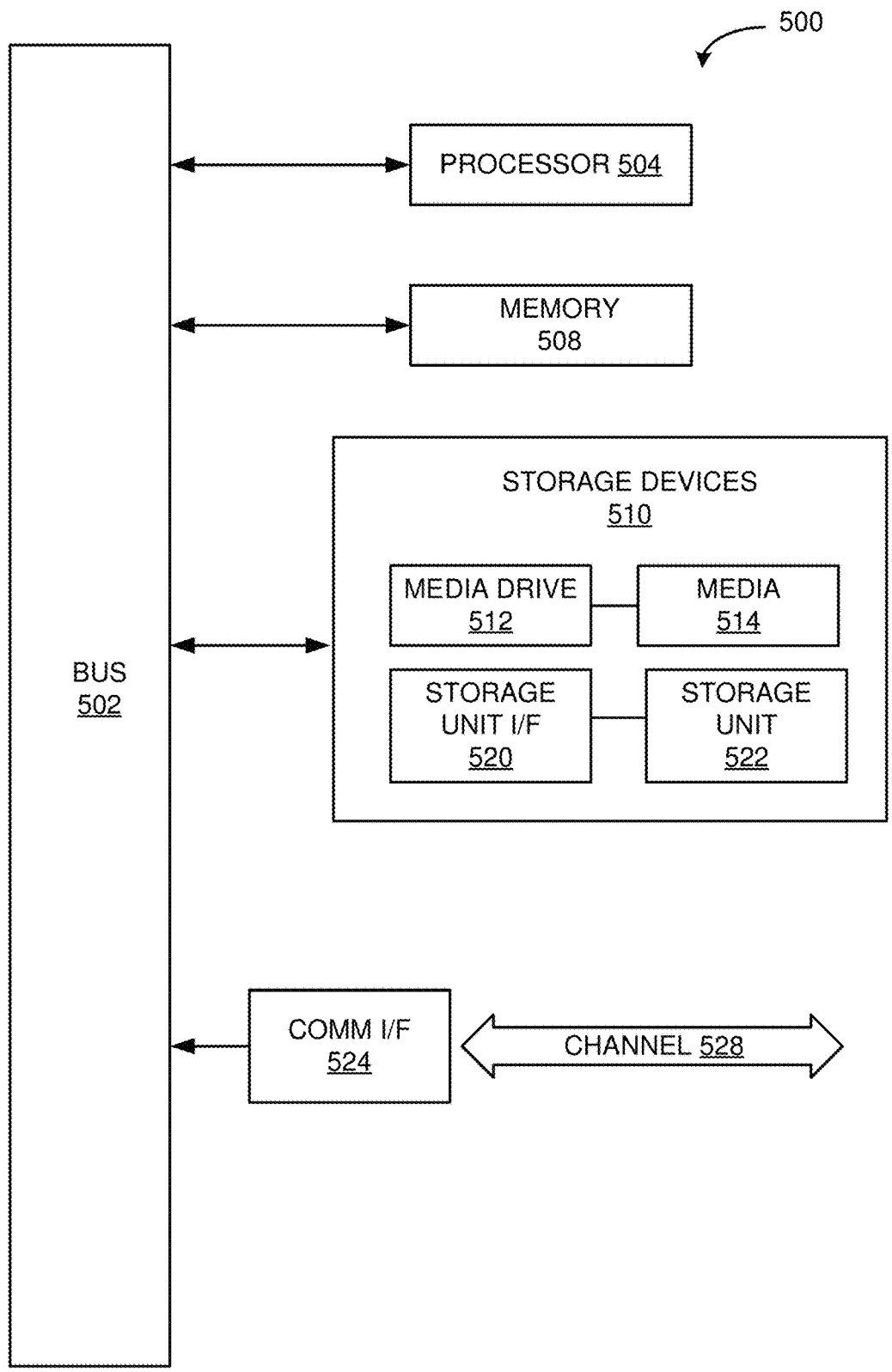
FIG. 5 is a diagram depicting an example computing module used to implement features according to certain embodiments of the provided disclosure.

FIG. 5 illustrates example computing module 500, which may in some instances include a processor/controller resident on a computer system (e.g., time resilient system 120). Computing module 500 may be used to implement various features and/or functionality of embodiments of the systems and methods disclosed herein. With regard to the above-described embodiments, one of skill in the art will appreciate additional variations and details regarding the functionality of the embodiments, as set forth herein in the context of systems and method described with reference to FIGS. 1 through 5. In this connection, it will also be appreciated by one of skill in the art that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the application are implemented in whole or in part using software, in one embodiment, these software elements may be implemented to operate with a computing or processing module capable of carrying out the functionality described with respect thereto. One such example computing module is shown in FIG. 5. Various embodiments are described in terms of example computing module 500. After reading this description, it will become apparent to a person skilled in the relevant art how to implement the application using other computing modules or architectures.

Referring to FIG. 5, computing module 500 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 500 is specifically purposed.

Computing module 500 may include, for example, one or more processors, controllers, control modules, or other processing devices, such as a processor 504. Processor 504 may be implemented using a special-purpose processing engine such as, for example, a microprocessor, controller, or other control logic. In the illustrated example, processor 504 is connected to bus 502, although any communication medium may be used to facilitate interaction with other components of computing module 500 or to communicate externally.

Computing module 500 may also include one or more memory modules, simply referred to herein as main memory 508. For example, random access memory (RAM) or other dynamic memory may be used for storing information and instructions to be executed by processor 504. Main memory 508 may also be used for storing temporary variables or other intermediate information during execution of instructions to be executed by processor 504. Computing module 500 may likewise include a read only memory (ROM) or other static storage device coupled to bus 502 for storing static information and instructions for processor 504.

Computing module 500 may also include one or more various forms of information storage devices 510, which may include, for example, media drive 512 and storage unit interface 520. Media drive 512 may include a drive or other mechanism to support fixed or removable storage media 514. For example, a hard disk drive, a floppy disk drive, a magnetic tape drive, an optical disk drive, a CD or DVD drive (R or RW), or other removable or fixed media drive may be provided. Accordingly, removable storage media 514 may include, for example, a hard disk, a floppy disk, magnetic tape, cartridge, optical disk, a CD or DVD, or other fixed or removable medium that is read by, written to or accessed by media drive 512. As these examples illustrate, removable storage media 514 may include a computer usable storage medium having stored therein computer software or data.

In alternative embodiments, information storage devices 510 may include other similar instrumentalities for allowing computer programs or other instructions or data to be loaded into computing module 500. Such instrumentalities may include, for example, fixed or removable storage unit 522 and storage unit interface 520. Examples of such removable storage units 522 and storage unit interfaces 520 may include a program cartridge and cartridge interface, a removable memory (for example, a flash memory or other removable memory module) and memory slot, a PCMCIA slot and card, and other fixed or removable storage units 522 and storage unit interfaces 520 that allow software and data to be transferred from removable storage unit 522 to computing module 500.

Computing module 500 may also include a communications interface 524. Communications interface 524 may be used to allow software and data to be transferred between computing module 500 and external devices. Examples of communications interface 524 include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 may typically be carried on signals, which may be electronic, electromagnetic (which includes optical) or other signals capable of being exchanged by a given communications interface 524. These signals may be provided to communications interface 524 via channel 528. Channel 528 may carry signals and may be implemented using a wired or wireless communication medium. Some non-limiting examples of channel 528 include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 508, storage unit interface 520, removable storage media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 500 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:
1. A time resilient system comprising:
  a receiver that collects time signals sourced from an external clock;
  an internal clock calibrated to a time reflected on the external clock so that the internal clock and the external clock are synchronized; and
  a controller that monitors a change in time signals of the external clock over a period of time against the internal clock;
  wherein the controller provides an alert indicating the presence of a timing attack on the time signals when the time signals collected from the receiver deviate from a pre-determined time range with the time of the internal clock,
  wherein the pre-determined time range is based on a trusted time that is calibrated to perform as a high precision clock, and further calibrated to an offset time to produce an adjusted trusted time and a constant time deviation between the initial trusted time and a received time of a time signal;

further comprising time consuming devices synchronized to the internal clock, wherein the controller outputs a timecode comprising time data of the internal clock calibrated to the external clock, such that the time consuming devices are synchronized to the timecode independent from the time signals collected from the receiver, wherein the timecode comprises a trusted IRIG signal which initially mimics the received time signal when first initializing or calibrating the time resilient system.

2. The time resilient system of claim 1, wherein the external clock is a high precision time source vulnerable to timing attacks that distort the accuracy of the time signals output from the external clock.

3. The time resilient system of claim 2, wherein the external clock is housed within a Global Positioning System.

4. The time resilient system of claim 3, wherein the receiver is a Global Positioning System receiver.

5. The time resilient system of claim 1, wherein the controller houses the internal clock.

6. A method of detecting and defending against invalid time signals comprising:
   obtaining a local time source from an internal clock housed within a controller;
   receiving a time signal from an external clock transmitted to the controller;
   calibrating the local time source to a time indicated on the external clock, such that a calibrated local time source is now a reference or trusted time;
   monitoring the time signal of the external clock against the reference time; and
   stopping updates to the reference time when a timing attack is identified, where the timing attack is when the time signals collected from the receiver deviate from a pre-determined time range with the reference time,
   wherein the pre-determined time range is based on a trusted time that is calibrated to perform as a high precision clock, and further calibrated to an offset time to produce an adjusted trusted time and a constant time deviation between the initial trusted time and a received time of a time signal;
   wherein the controller outputs a timecode comprising time data of the internal clock calibrated to the external clock, such that one or more time consuming devices are synchronized to the timecode independent from the time signals collected from the receiver, wherein the timecode comprises a trusted RIG signal which initially mimics the received time signal when first initializing or calibrating the time resilient system.

7. The method of claim 6, further comprising synchronizing time consuming devices to the reference time.

8. The method of claim 6, wherein the time signal is sourced from a Global Positioning System.

9. The method of claim 7, further comprising periodically updating the reference time to the external clock to prevent clock drifting.

10. The method of claim 6, wherein the reference time stops calibrating against the external clock in the instance of an identified timing attack.

11. The method of claim 10, further comprising continuing to synchronize the time consuming devices against the reference time in the instance of the identified timing attack for a select period of time.

12. The method of claim 11, further comprising continuing to identify the presence of the timing attack until the received time reverts back to an acceptable deviation time range between the reference time and the time signal.

13. A method of detecting and defending against invalid time signals comprising:
   obtaining a local time source from an internal clock housed within a controller;
   receiving a time signal from an external clock transmitted to the controller;
   calibrating the local time source to a time indicated on the external clock, such that a calibrated local time source is now a reference or trusted time;
   monitoring the time signal of the external clock against the reference time; and
   alerting the presence of a timing attack when the time signal collected from the receiver exceed a pre-determined time range with the reference time,
   wherein the pre-determined time range is based on a trusted time that is calibrated to perform as a high precision clock, and further calibrated to an offset time to produce an adjusted trusted time and a constant time deviation between the initial trusted time and a received time of a time signal;
   wherein the controller outputs a timecode comprising time data of the internal clock calibrated to the external clock, such that one or more time consuming devices are synchronized to the timecode independent from the time signals collected from the receiver, wherein the timecode comprises a trusted RIG signal which initially mimics the received time signal when first initializing or calibrating the time resilient system.

14. The method of claim 13, further comprising continuing to identify the presence of the timing attack until the time signal reverts back to an acceptable deviation time range between the reference time and the time signal.

15. The method of claim 14, further comprising synchronizing time consuming devices against the reference time, such that the time consuming devices are synched to precise timing information sourced from the reference time without a potential threat of being impacted by the timing attack.

* * * * *

UNITED STATES PATENT AND TRADEMARK OFFICE
CERTIFICATE OF CORRECTION

PATENT NO. : 11,487,871 B2
APPLICATION NO. : 15/348901
DATED : November 1, 2022
INVENTOR(S) : Ben Abbott et al.

It is certified that error appears in the above-identified patent and that said Letters Patent is hereby corrected as shown below:

In the Claims

Column 11, Claim 6, Line 51, that reads "trusted RIG signal" should read -trusted IRIG signal- Column 12, Claim 13, Line 43, that reads "trusted RIG signal" should read -trusted IRIG signal- Signed and Sealed this
Second Day of May, 2023

Katherine Kelly Vidal
*Director of the United States Patent and Trademark Office*